United States Patent
Lee et al.

(10) Patent No.: US 9,854,245 B2
(45) Date of Patent: *Dec. 26, 2017

(54) METHOD AND APPARATUS FOR COEFFICIENT SCAN BASED ON PARTITION MODE OF PREDICTION UNIT

(71) Applicant: KT CORPORATION, Gyeonggi-do (KR)

(72) Inventors: Bae Keun Lee, Gyeonggi-do (KR); Jae Cheol Kwon, Daejeon (KR); Joo Young Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,828

(22) Filed: Jul. 7, 2016

(65) Prior Publication Data

US 2016/0316208 A1    Oct. 27, 2016

Related U.S. Application Data

(63) Continuation of application No. 15/015,178, filed on Feb. 4, 2016, now Pat. No. 9,565,442, which is a (Continued)

(30) Foreign Application Priority Data

Nov. 8, 2011 (KR) .................. 10-2011-0116126
Nov. 8, 2012 (KR) .................. 10-2012-0125799

(51) Int. Cl.
*H04N 19/147* (2014.01)
*H04N 19/105* (2014.01)
(Continued)

(52) U.S. Cl.
CPC ......... *H04N 19/147* (2014.11); *H04N 19/105* (2014.11); *H04N 19/119* (2014.11);
(Continued)

(58) Field of Classification Search
CPC ................................................ H04N 19/139
(Continued)

(56) References Cited

U.S. PATENT DOCUMENTS 5,506,622 A    4/1996   Kim
7,154,952 B2  12/2006   Tourapis et al.
(Continued)

FOREIGN PATENT DOCUMENTS

CN    1335021 A    2/2002
CN    1457604 A    11/2003
(Continued)

OTHER PUBLICATIONS

Gradient based fast mode decision algorithm for intra prediction in HEVC; Wei; Apr. 2012.*
(Continued)

*Primary Examiner* — William Vaughn
*Assistant Examiner* — Luis Perez Fuentes
(74) *Attorney, Agent, or Firm* — IP Legal Services, LLC

(57) ABSTRACT

Provided are a method and an apparatus for coefficient scan on the base of a partition mode of a prediction unit. The method comprises the steps of: determining a scan method on the basis of a partition mode of a prediction unit; and encoding the information about the scan method, wherein the scan method is determined, on the basis of RDO (Rate Distortion optimization), from among the extracted candidate scan methods which have been extracted with consideration of the shapes of the partitions of the partition mode.

3 Claims, 8 Drawing Sheets

Related U.S. Application Data continuation of application No. 14/605,351, filed on Jan. 26, 2015, now Pat. No. 9,294,773, which is a continuation of application No. 14/356,788, filed as application No. PCT/KR2012/009373 on Nov. 8, 2012, now Pat. No. 9,225,990.

(51) Int. Cl.

| | | |
|---|---|---|
| *H04N 19/176* | (2014.01) | |
| *H04N 19/119* | (2014.01) | |
| *H04N 19/129* | (2014.01) | |
| *H04N 19/18* | (2014.01) | |
| *H04N 19/157* | (2014.01) | |
| *H04N 19/139* | (2014.01) | |
| *H04N 19/44* | (2014.01) | |
| *H04N 19/593* | (2014.01) | |
| *H04N 19/50* | (2014.01) | |

(52) U.S. Cl.
CPC ......... *H04N 19/129* (2014.11); *H04N 19/139* (2014.11); *H04N 19/157* (2014.11); *H04N 19/176* (2014.11); *H04N 19/18* (2014.11); *H04N 19/44* (2014.11); *H04N 19/50* (2014.11); *H04N 19/593* (2014.11)

(58) Field of Classification Search
USPC .......................................................... 375/240
See application file for complete search history.

(56) References Cited

U.S. PATENT DOCUMENTS

| | | | |
|---|---|---|---|
| 7,356,082 | B1 | 4/2008 | Kuhn |
| 7,627,185 | B2 | 12/2009 | Miyazawa et al. |
| 8,792,549 | B2* | 7/2014 | Liu ...................... H04N 19/176 375/240.01 |
| 9,225,990 | B2* | 12/2015 | Lee ...................... H04N 19/139 |
| 9,294,773 | B2* | 3/2016 | Lee ...................... H04N 19/139 |
| 9,374,582 | B2 | 6/2016 | Oh et al. |
| 9,420,300 | B2 | 8/2016 | Helle et al. |
| 9,420,304 | B2 | 8/2016 | Kim et al. |
| 9,596,466 | B2* | 3/2017 | Kim ...................... H04N 19/503 |
| 2003/0076883 | A1 | 4/2003 | Bottreau et al. |
| 2004/0013202 | A1 | 1/2004 | Lainema |
| 2004/0047418 | A1 | 3/2004 | Tourapis et al. |
| 2004/0066848 | A1 | 4/2004 | Jeon |
| 2005/0036701 | A1 | 2/2005 | Miyazawa et al. |
| 2005/0074177 | A1 | 4/2005 | Ichimura et al. |
| 2005/0129118 | A1 | 6/2005 | Jeon |
| 2005/0129119 | A1 | 6/2005 | Jeon |
| 2005/0129120 | A1 | 6/2005 | Jeon |
| 2006/0056512 | A1 | 3/2006 | Barrau |
| 2007/0223579 | A1 | 9/2007 | Bao |
| 2007/0291849 | A1 | 12/2007 | Lainema |
| 2008/0031332 | A1 | 2/2008 | Jeon |
| 2008/0031341 | A1 | 2/2008 | Jeon |
| 2008/0031342 | A1 | 2/2008 | Jeon |
| 2008/0031343 | A1 | 2/2008 | Jeon |
| 2008/0037639 | A1 | 2/2008 | Jeon |
| 2008/0037640 | A1 | 2/2008 | Jeon |
| 2008/0037644 | A1 | 2/2008 | Jeon |
| 2008/0043848 | A1 | 2/2008 | Kuhn |
| 2008/0080779 | A1 | 4/2008 | Nakanishi |
| 2008/0204602 | A1 | 8/2008 | Beric et al. |
| 2009/0067497 | A1 | 3/2009 | Jeon |
| 2009/0067498 | A1 | 3/2009 | Jeon |
| 2009/0067499 | A1 | 3/2009 | Jeon |
| 2009/0067500 | A1 | 3/2009 | Jeon |
| 2009/0074062 | A1 | 3/2009 | Jeon |
| 2009/0074063 | A1 | 3/2009 | Jeon |
| 2009/0074064 | A1 | 3/2009 | Jeon |
| 2009/0074065 | A1 | 3/2009 | Jeon |
| 2009/0074066 | A1 | 3/2009 | Jeon |
| 2009/0074067 | A1 | 3/2009 | Jeon |
| 2009/0074068 | A1 | 3/2009 | Jeon |
| 2009/0074069 | A1 | 3/2009 | Jeon |
| 2009/0116759 | A1 | 5/2009 | Suzuki et al. |
| 2010/0220790 | A1 | 9/2010 | Jeon et al. |
| 2011/0188572 | A1 | 8/2011 | Min et al. |
| 2012/0008683 | A1 | 1/2012 | Karczewicz et al. |
| 2012/0008690 | A1 | 1/2012 | Lee et al. |
| 2012/0128070 | A1 | 5/2012 | Kim et al. |
| 2012/0140813 | A1 | 6/2012 | Sole et al. |
| 2012/0140814 | A1 | 6/2012 | Sole et al. |
| 2012/0163455 | A1 | 6/2012 | Zheng et al. |
| 2012/0163456 | A1 | 6/2012 | Coban et al. |
| 2012/0163472 | A1 | 6/2012 | Sole et al. |
| 2012/0195368 | A1* | 8/2012 | Chien ...................... H04N 19/52 375/240.02 |
| 2012/0213288 | A1 | 8/2012 | Kitaura et al. |
| 2012/0250769 | A1 | 10/2012 | Bross et al. |
| 2012/0257678 | A1 | 10/2012 | Zhou et al. |
| 2012/0263229 | A1 | 10/2012 | Lim et al. |
| 2012/0320976 | A1 | 12/2012 | Suzuki et al. |
| 2013/0039426 | A1 | 2/2013 | Helle et al. |
| 2013/0070854 | A1 | 3/2013 | Wang et al. |
| 2013/0114717 | A1 | 5/2013 | Zheng et al. |
| 2013/0208787 | A1 | 8/2013 | Zheng et al. |
| 2013/0215967 | A1 | 8/2013 | Jeon |
| 2013/0229485 | A1 | 9/2013 | Rusanovskyy et al. |
| 2013/0266071 | A1 | 10/2013 | Jeon et al. |
| 2013/0272416 | A1 | 10/2013 | Jeon et al. |
| 2013/0272417 | A1 | 10/2013 | Jeon et al. |
| 2013/0272418 | A1 | 10/2013 | Jeon et al. |
| 2014/0098870 | A1 | 4/2014 | Jeon |
| 2014/0098871 | A1 | 4/2014 | Jeon |
| 2014/0098872 | A1 | 4/2014 | Jeon |
| 2014/0098873 | A1 | 4/2014 | Jeon |
| 2014/0098874 | A1 | 4/2014 | Jeon |
| 2014/0098875 | A1 | 4/2014 | Jeon |
| 2014/0314143 | A1 | 10/2014 | Lee et al. |
| 2014/0341274 | A1 | 11/2014 | Sole et al. |
| 2015/0036749 | A1 | 2/2015 | Jeon et al. |
| 2015/0229925 | A1 | 8/2015 | Won et al. |
| 2017/0127059 | A1* | 5/2017 | Kim ...................... H04N 19/105 |

FOREIGN PATENT DOCUMENTS

| | | |
|---|---|---|
| CN | 1723477 | 1/2006 |
| CN | 101156450 | 4/2008 |
| CN | 101860754 A | 10/2010 |
| CN | 102227132 A | 10/2011 |
| EP | 2656607 A1 | 10/2013 |
| JP | 2009-224854 A | 10/2009 |
| KR | 10-2005-0042276 A | 5/2005 |
| KR | 10-2009-0072150 A | 7/2009 |
| KR | 10-2010-0095992 A | 9/2010 |
| KR | 10-2011-0068897 A | 6/2011 |
| KR | 10-2011-0090065 A | 8/2011 |
| RU | 2350040 C1 | 3/2009 |
| RU | 2391794 C2 | 6/2010 |
| RU | 2406258 C2 | 12/2010 |
| WO | 2007/004678 A1 | 1/2007 |
| WO | 2009/051419 A2 | 4/2009 |
| WO | 2011/054879 A2 | 5/2011 |
| WO | 2011/115659 A1 | 9/2011 |
| WO | 2011/128259 A1 | 10/2011 |
| WO | 2012087713 A1 | 6/2012 |

OTHER PUBLICATIONS

Fast Intra Prediction Algorithm for H.264-AVC Based on Quadratic and Gradient Mode!; 2010.*
Fast and Efficient Intra Mode Selection for H.264-AVC; Fang; Jan. 2010.*
NPL SPIE—search log.*
Thomas Wiegand et al., "WD3: Working Draft 3 of High-Efficiency Video Coding", Joint Collaborative Team on Video Coding (JCT-

(56) References Cited

OTHER PUBLICATIONS

VC) of ITU-T SG16 WP3 and ISO/IEC JTC1/SC29/WG11 5th Meeting: Geneva, CH, Mar. 16-23, 2011, Document: JCTVC-E603.

* cited by examiner

FIG. 3
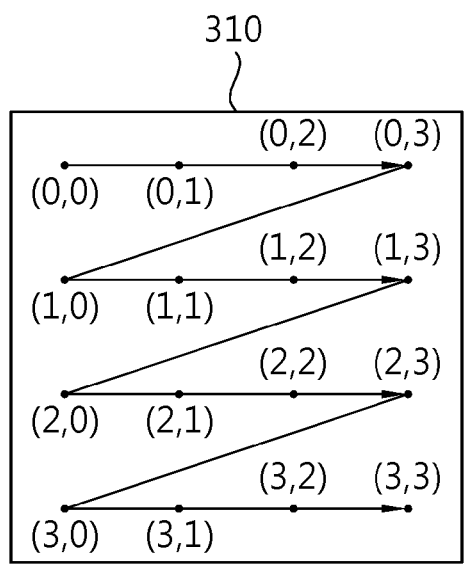
Horizontal scanning
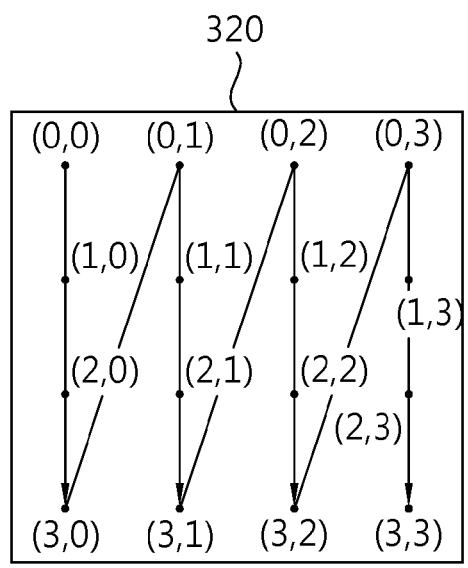
Vertical scanning
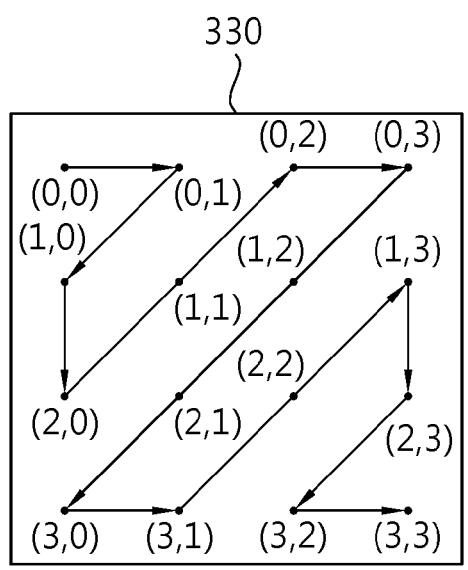
Zigzag scanning
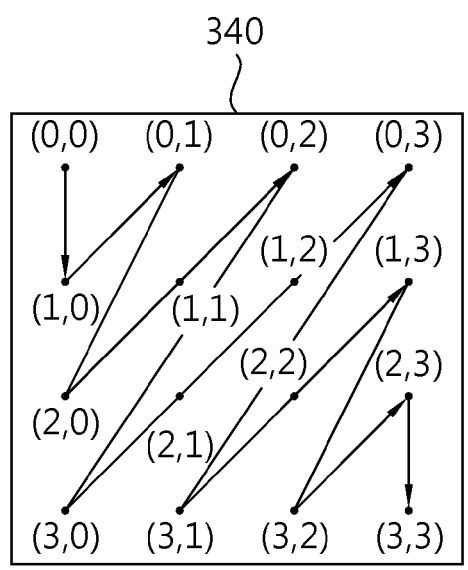
Upright diagonal scanning

METHOD AND APPARATUS FOR COEFFICIENT SCAN BASED ON PARTITION MODE OF PREDICTION UNIT

CROSS REFERENCE TO RELATED APPLICATIONS

The application is a Continuation of U.S. patent application Ser. No. 15/015,178 (filed on Feb. 4, 2016), which is a Continuation of U.S. patent application Ser. No. 14/605,351 (filed on Jan. 26, 2015), now issued as U.S. Pat. No. 9,294,773, which is a Continuation of U.S. patent application Ser. No. 14/356,788 (filed on May 7, 2014), now issued as U.S. Pat. No. 9,225,990, which is a National Stage Patent Application of PCT International Patent Application No. PCT/KR2012/009373 (filed on Nov. 8, 2012) under 35 U.S.C. §371, which claims priority to Korean Patent Application Nos. 10-2011-0116126 (filed on Nov. 8, 2011) and 10-2012-0125799 (filed on Nov. 8, 2012), the teachings of which are incorporated herein in their entireties by reference.

TECHNICAL FIELD

The present invention relates to video encoding and decoding, and more particularly, to a method and an apparatus for determining a scan method based on a partition mode of a prediction unit and encoding/decoding information thereof.

BACKGROUND ART

Recently, demands for high-resolution and high-quality videos, such as high-definition (HD) and ultrahigh-definition (UHD) videos, are increasing in various fields of applications. As video data has higher resolution and higher quality, the amount of data more increases relative to existing usual video data. Accordingly, when video data is transferred using media such as existing wired and wireless broad band lines or is stored in existing storage media, transfer cost and storage cost increase. In order to solve these problems occurring with an increase in resolution and quality of video data, high-efficiency video compression techniques may be utilized.

Video compression technology includes various techniques, such as an inter prediction technique of predicting pixel values included in a current picture from previous or subsequent pictures of the current picture, an intra prediction technique of predicting pixel values included in a current picture using pixel information in the current picture, and an entropy encoding technique of assigning a short code to a value with a high appearance frequency and assigning a long code to a value with a low appearance frequency. Video data may be effectively compressed and transferred or stored using such video compression techniques.

DISCLOSURE

Technical Problem

An aspect of the present invention is to provide a method of determining a scan method based on a partition mode of a prediction unit for improving video encoding/decoding efficiency and encoding/decoding the scan method.

Another aspect of the present invention is to provide an apparatus for determining a scan method based on a partition mode of a prediction unit for improving video encoding/decoding efficiency and encoding/decoding the scan method.

Technical Solution

An embodiment of the present invention provides a video encoding method. The method includes determining a scanning method based on a partition mode of a prediction unit, and encoding information on the scanning method, wherein the scanning method is determined based on rate-distortion optimization (RDO) among candidate scanning methods derived in view of a partition shape of the partition mode.

The determining of the scanning method may derive horizontal scanning and zigzag scanning as the candidate scanning methods when the partition mode has a vertically oriented partition shape and derive vertical scanning and zigzag scanning as the candidate scanning methods when the partition mode has a horizontally oriented partition shape.

The partition mode may include an N×2N mode, a 2N×N mode, a 2N×2N mode, an N×N mode, a 2N×nU mode, a 2N×nD mode, an nL×2N mode and an nR×2N mode based on a size of the prediction unit for which inter prediction has been performed.

The partition mode having the vertically oriented partition shape may include the N×2N mode, the nL×2N mode and the nR×2N mode, wherein the partition mode having the vertically oriented partition shape is a ½N×2N mode of a left partition with a smaller partition size for the nL×2N mode and the partition mode having the vertically oriented partition shape is a ½N×2N mode of a right partition with a smaller partition size for the nR×2N mode.

The partition mode having the horizontally oriented partition shape may include the 2N×N mode, the 2N×nU mode and the 2N×nD mode, wherein the partition mode having the horizontally oriented partition shape is a 2N×½N mode of an upper partition with a smaller partition size for the 2N×nU mode and the partition mode having the horizontally oriented partition shape is es a 2N×½N mode of a lower partition with a smaller partition size for the 2N×nD mode.

The determining of the scanning method may determine zigzag scanning as the scanning method when the partition mode is the 2N×2N mode, the N×N mode, a 3/2N×2N mode of a right partition with a larger partition size in the nL×2N mode, a 3/2N×2N mode of a left partition with a larger partition size in the nR×2N mode, a 2N×3/2N mode of a lower partition with a larger partition size in the 2N×nU mode or a 2N×3/2N mode of an upper partition with a larger partition size in the 2N×nD mode.

The information on the scanning method may be indicated using a flag, and the flag may indicate whether zigzag scanning is used.

Another embodiment of the present invention provides a video encoding method. The method includes determining a scanning method based on a partition mode of a prediction unit for which short distance intra prediction (SDIP) has been performed, and encoding information on the scanning method, wherein the scanning method is determined based on RDO among candidate scanning methods derived in view of a partition shape of the partition mode.

The determining of the scanning method may derive horizontal scanning and zigzag scanning as the candidate scanning methods when the partition mode has a vertically oriented partition shape and derive vertical scanning and zigzag scanning as the candidate scanning methods when the partition mode has a horizontally oriented partition shape.

The partition mode may include a ½N×2N mode, a 2N×½N mode, an N×N mode and a 2N×2N mode based on a size of the prediction unit for which SDIP has been performed.

The partition mode having the vertically oriented partition shape may include is the ½N×2N mode, and the partition mode having the horizontally oriented partition shape may include the 2N×½N mode.

The determining of the scanning method may determine zigzag scanning as the scanning method when the partition mode is the N×N mode or the 2N×2N mode.

The information on the scanning method may be indicated using a flag, and the flag may indicate whether zigzag scanning is used.

Still another embodiment of the present invention provides a video encoding method. The method includes determining a scanning method based on a partition mode of a prediction unit, and inverse-scanning a transform coefficient according to the scanning method, wherein the scanning method is determined based on the partition mode using information signaled from an encoding apparatus, and the signaled information is a flag indicates whether zigzag scanning is used.

The determining of the scanning method may decode the flag indicating whether zigzag scanning is used and determine the scanning method based on a value of the decoded flag when the partition mode has a vertically oriented partition shape or horizontally oriented partition shape, in which one of zigzag scanning and horizontal scanning may be selected based on the value of the decoded flag when the partition mode is the vertically oriented partition shape, and one of zigzag scanning and vertical scanning may be selected based on the value of the decoded flag when the partition mode has the horizontally oriented partition shape.

The partition mode may include an N×2N mode, a 2N×N mode, a 2N×2N mode, an N×N mode, a 2N×nU mode, a 2N×nD mode, an nL×2N mode and an nR×2N mode based on a size of the prediction unit for which inter prediction is performed.

the partition mode having the vertically oriented partition shape comprises the N×2N mode, the nL×2N mode and the nR×2N mode, wherein the partition mode having the vertically oriented partition shape is a ½N×2N mode of a left partition with a smaller partition size for the nL×2N mode and the partition mode having the vertically oriented partition shape is a ½N×2N mode of a right partition with a smaller partition size for the nR×2N mode, and wherein the partition mode having the horizontally oriented partition shape comprises the 2N×N mode, the 2N×nU mode and the 2N×nD mode, wherein s the partition mode having the horizontally oriented partition shape is a 2N×½N mode of an upper partition with a smaller partition size for the 2N×nU mode and the partition mode having the horizontally oriented partition shape is a 2N×½N mode of a lower partition with a smaller partition size for the 2N×nD mode The determining of the scanning method may determine zigzag scanning as the scanning method when the partition mode is the 2N×2N mode, the N×N mode, a 3/2N×2N mode of a right partition with a larger partition size in the nL×2N mode, a 3/2N×2N mode of a left partition with a larger partition size in the nR×2N mode, a 2N×3/2N mode of a lower partition with a larger partition size in the 2N×nU mode or a 2N×3/2N mode of an upper partition with a larger partition size in the 2N×nD mode.

The partition mode may include a ½N×2N mode, a 2N×½N mode, an N×N mode and a 2N×2N mode based on a size of the prediction unit in SDIP, the partition mode having the vertically oriented partition shape including is the ½N×2N mode and the partition mode having the horizontally oriented partition shape including the 2N×½N mode.

The determining of the scanning method may determine zigzag scanning as the scanning method when the partition mode is the N×N mode or the 2N×2N mode.

Advantageous Effects

According to the present invention, a scanning method for transform coefficients is determined using a partition mode of a prediction unit, that is, particular directivity or particular texture of the prediction unit, thereby increasing efficiency in encoding and decoding.

DESCRIPTION OF DRAWINGS

FIG. 3 schematically illustrates a coefficient scanning method according to the present invention.

MODE FOR INVENTION

Figure 1:
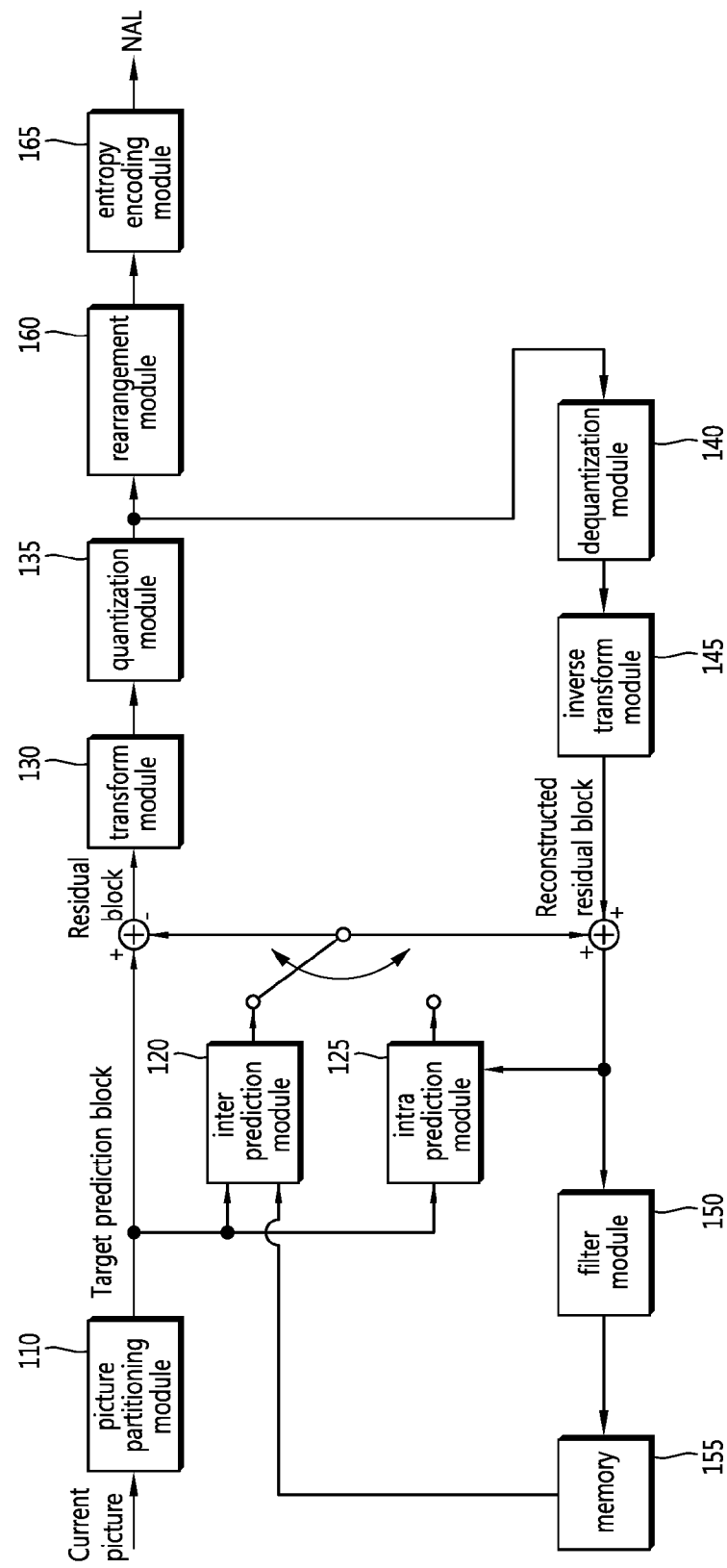
FIG. 1 is a block diagram illustrating a video encoding apparatus according to an exemplary embodiment of the present invention.

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a video encoding apparatus according to an exemplary embodiment of the present invention.

Referring to FIG. 1, the video encoding apparatus 100 includes a picture partition module 110, prediction modules 120 and 125, a transform module 130, a quantization module 135, a rearrangement module 160, an entropy encoding module 165, a dequantization module 140, an inverse transform module 145, a filter module 150 and a memory 155.

Although elements illustrated in FIG. 1 are independently shown so as to represent different distinctive functions in the video encoding apparatus, such a configuration does not indicate that each element is constructed by a separate hardware constituent or software constituent. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture partition module 110 may partition an input picture into at least one process unit. Here, the process unit may be a prediction unit (PU), a transform unit (TU) or a coding unit (CU). The picture partition module 110 may partition one picture into a plurality of combinations of CUs, PUs and TUs and select one combination of CUs, PUs and TUs on the basis of a predetermined criterion (for example, a cost function), thereby encoding the picture.

For example, one picture may be partitioned into a plurality of CUs. A recursive tree structure, such as a quad tree structure, may be used to partition a picture into CUs. A CU, for which a picture or a CU of a maximum size may be as root, may be partitioned into sub-coding units with as many child nodes as the partitioned CUs. A CU which is not partitioned any more in accordance with a predetermined limitation is a leaf node. That is, assuming that a CU may be partitioned into quadrants only, a single CU may be partitioned into at most four different CUs.

In the embodiments of the invention, a CU may be used to refer to not only a unit of encoding but also a unit of decoding.

A PU may be partitioned into at least one square or rectangular form with the same size in a CU. For PUs partitioned from a same CU, a PU may have different shape from other PUs.

When a PU for intra prediction is generated based on a CU and the CU is not a minimum CU, the CU may be subjected to intra prediction without being partitioned into plural PUs (N×N).

The prediction modules 120 and 125 may include an inter prediction module 120 to perform inter prediction and an intra prediction module 125 to perform intra prediction. The prediction modules 120 and 125 may determine which of inter prediction and intra prediction should be performed on a PU, and may determine specific information (for example, an intra prediction mode, a motion vector, and a reference picture) of the determined prediction method. Here, a process unit on which prediction is performed may be different from a process unit for which a prediction method and specific information thereon are determined. For example, a prediction method and a prediction mode may be determined for each PU, while prediction may be performed for each TU. A residual value (residual block) between a generated predicted block and an original block may be input to the transform module 130. Further, prediction mode information, motion vector information and the like used for prediction may be encoded along with the residual value by the entropy encoding module 165 and be transmitted to the decoding apparatus. When a specific encoding mode is used, the original block may be encoded and transmitted to the decoding apparatus without generating a prediction block by the prediction modules 120 and 125.

The inter prediction module 120 may predict a PU on the basis of information on at least one picture among a previous picture of a current picture and a subsequent picture of a current picture. The inter prediction module 120 may include a reference picture interpolation module, a motion prediction module, and a motion compensation module.

The reference picture interpolation module may be supplied with reference picture information from the memory 155 and generate pixel information less than an integer pixel from a reference picture. In the case of luma pixels, a DCT-based 8-tap interpolation filter with a variable filter coefficient may be used to generate information on a pixel smaller than an integer pixel in a unit of a ¼ pixel. In the case of chroma pixels, a DCT-based 4-tap interpolation filter with a variable filter coefficient may be used to generate information on a pixel smaller than an integer pixel in a unit of a ⅛ pixel.

The motion prediction module may perform motion prediction on the basis of the reference picture interpolated by the reference picture interpolation module. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction module may predict a current PU using different motion prediction methods. Various methods, such as skip mode, merge mode, and advanced motion vector prediction (AMVP), etc. may be used as the motion prediction method.

The intra prediction module 125 may generate a PU on the basis of information on a reference pixel neighboring to a current block. The information on a reference pixel neighboring to the current block is pixel information in a current picture. When a reference pixel is a pixel for which inter prediction has been performed because a block, which includes the reference pixel, neighboring to the current PU is a block for which inter prediction has been performed, information on a reference pixel included in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to obtain luma information or predicted luma signal information may be used to predict chroma information.

If a PU and a TU have the same size when intra prediction is performed, intra prediction on the PU may be performed based on left pixels, an upper-left pixel and upper pixels of the PU. On the other hand, if a PU and a TU have different sizes when intra prediction is performed, intra prediction may be performed using reference pixels based on the TU. Intra prediction using N×N partitioning may be performed only for a minimum CU.

In the intra prediction method, a predicted block may be generated according to the prediction mode after an adaptive intra smoothing (AIS) filter being applied. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information which is a difference between the original block of the PU and the predicted block of a PU generated based on the PU generated by the prediction modules 120 and 125, may be generated. The generated residual block may be input to the transform module 130.

The transform module 130 may transform the residual block using a transform method such as Discrete Cosine Transform (DCT) or Discrete Sine Transform (DST). The residual block includes information on the residual between the PU generated by the prediction modules 120 and 125 and the original block. A transform method to be used to transform the residual block may be determined among DCT and DST on the basis of the information on the intra prediction mode applied to the PU which is used to generate the residual block.

The quantization module 135 may quantize values transformed into a frequency domain by the transform module 130. A quantization coefficient may change depending on a block or importance of a picture. Values output from the quantization module 135 may be provided to the dequantization module 140 and the rearrangement module 160.

The rearrangement module 160 may rearrange coefficients with respect to quantized residual values.

The rearrangement module 160 may change a two-dimensional (2D) block of coefficients into a one-dimensional (1D) vector of coefficients through coefficient scanning. For example, the rearrangement module 125 may change a 2D block of coefficients into a 1D vector of coefficients by scanning from DC coefficients to coefficients of a high frequency domain using zigzag scanning. Vertical scanning for scanning a 2D block of coefficients in a vertical direction and horizontal scanning for scanning a 2D block of coefficients in a horizontal direction may be used depending on a size of a TU and an intra prediction mode, instead of zigzag scanning. That is, a scanning method for use may be selected based on the size of the TU and the intra prediction mode among zigzag scanning, vertical scanning, and horizontal scanning.

The entropy encoding module 165 may perform entropy encoding on the basis of the values obtained by the rearrangement module 160. Various encoding methods, such as exponential Golomb coding, context-adaptive variable length coding (CAVLC), or context-adaptive binary arithmetic coding (CABAC), may be used for entropy encoding.

The entropy encoding module 165 may encode a variety of information, such as residual coefficient information and block type information on a CU, prediction mode information, partitioning unit information, PU information, transfer unit information, motion vector information, reference frame information, block interpolation information and filtering information from the rearrangement module 160 and the prediction modules 120 and 125.

The entropy encoding module 165 may entropy-encode coefficients of a CU input from the rearrangement module 160.

The dequantization module 140 and the inverse transform module 145 dequantize the values which are quantized by the quantization module 135 and inversely transform the values which are transformed by the transform module 130. The residual values generated by the dequantization module 140 and the inverse transform module 145 may be added to the predicted PU. The predicted PU may be predicted by the motion vector prediction module, the motion compensation module, and the intra prediction module of the prediction modules 120 and 125. A reconstructed block may be generated by adding the residual values to the predicted PU (predicted values).

The filter module 150 may include at least one of a deblocking filter, an offset module, and an adaptive loop filter (ALF).

The deblocking filter may remove block distortion generated on boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset module may apply an offset form the original picture in the unit of a pixel to the picture for which the deblocking filtering process is completed. A region to which the offset may be applied may be determined after partitioning pixels of a picture into a predetermined number of regions. The offset may be applied to the determined area in consideration of edge information on each pixel and the method of applying the offset to the determined area.

The ALF may perform filtering based on a comparison result of the filtered reconstructed picture and the original picture. Pixels included in a picture may be partitioned into predetermined groups, a filter to be applied to each group may be determined, and differential filtering may be performed for each group. Information on whether to apply the ALF may be transferred by each coding unit (CU) and a size and coefficient of an ALF to be applied to each block may vary. The ALF may have various types and a number of coefficients included in a corresponding filter may vary. Further, an ALF filter with the same form (fixed form) may be applied to a block regardless of characteristics of the block.

The memory 155 may store a reconstructed block or picture output from the filter module 150, and the stored reconstructed block or picture may be supplied to the prediction modules 120 and 125 when performing inter prediction.

Figure 2:
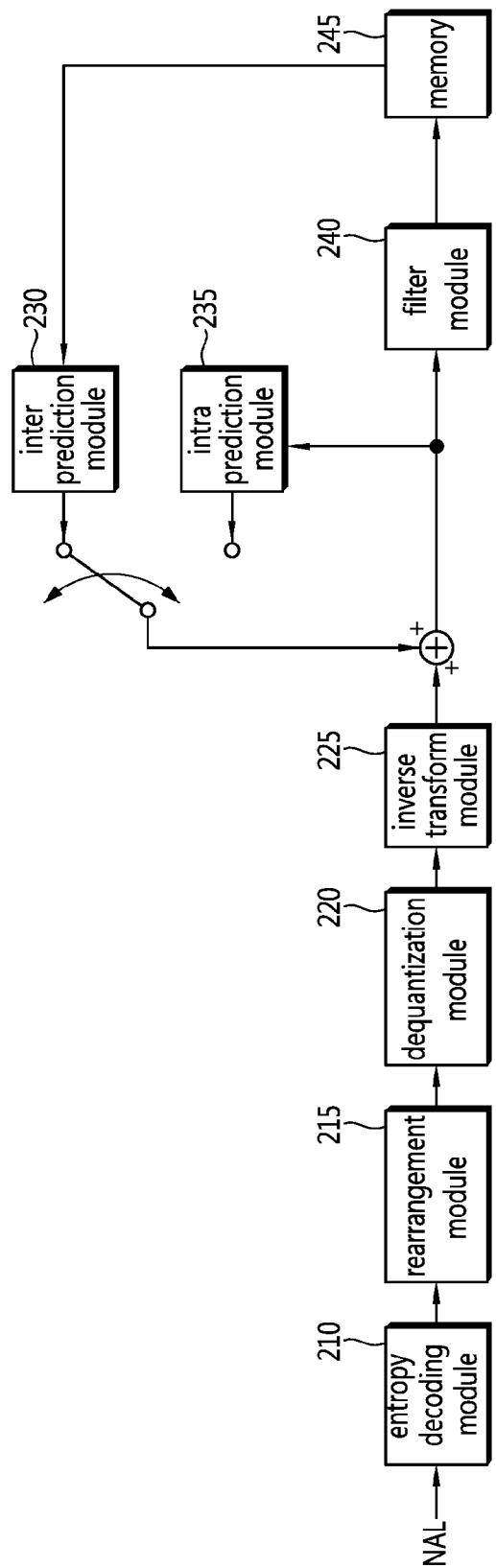
FIG. 2 is a block diagram illustrating a video decoding apparatus according to an exemplary embodiment of the present invention.

FIG. 2 is a block diagram illustrating a video decoding apparatus according an exemplary embodiment of the present invention.

Referring to FIG. 2, the video decoding apparatus 200 may include an entropy decoding module 210, a rearrangement module 215, a dequantization module 220, an inverse transform module 225, prediction modules 230 and 235, a filter module 240, and a memory 245.

When a video bitstream is input from the video encoding apparatus, the input bitstream may be decoded according to an inverse process of the video encoding process performed in the video encoding apparatus.

The entropy decoding module 210 may perform entropy decoding according to an inverse process of the entropy encoding process by the entropy encoding module of the video encoding apparatus. For example, various methods, such as exponential Golomb coding, CAVLC or CABAC, may be used for entropy encoding, corresponding to the method used by the video encoding apparatus.

The entropy decoding module 210 may decode information associated with intra prediction and inter prediction performed by the encoding apparatus.

The rearrangement module 215 may perform rearrangement on the bit stream entropy-decoded by the entropy decoding module 210 on the basis of the rearrangement method of the encoding module. The rearrangement module 215 may reconstruct and rearrange coefficients in a 1D vector form into coefficients in a 2D block. The rearrangement module 215 may be provided with information on coefficient scanning performed by the encoding apparatus and may perform rearrangement using a method of inversely scanning the coefficients on the basis of scanning order in which scanning is performed by the encoding apparatus.

The dequantization module 220 may perform dequantization on the basis of a quantization parameter provided from the encoding apparatus and the rearranged coefficients of the block.

The inverse transform module 225 may perform inverse DCT and inverse DST on a result of quantization performed by the video encoding apparatus, having been subjected to DCT and DST performed by the transform module. Inverse transform may be performed on the basis of a transfer unit determined by the video encoding apparatus. The transform module of the video encoding apparatus may selectively perform DCT and DST depending on a plurality of information elements, such as a prediction method, a size of the current block and a prediction direction, etc. and the inverse transform module 225 of the video decoding apparatus may perform inverse transform on the basis of information on the transform performed by the transform module of the video encoding apparatus.

The prediction modules 230 and 235 may generate a prediction block (predicted block) on the basis of prediction block generation information supplied from the entropy decoding module 210 and information on a previously-decoded block or picture provided from the memory 245.

Similarly to the operation of the video encoding apparatus as described above, if a PU and a TU have the same size when intra prediction is performed, intra prediction on the PU is performed based on left pixels, an upper-left pixel and upper pixels of the PU. On the other hand, if a PU and a TU have different sizes when intra prediction is performed, intra prediction may be performed using reference pixels based on the TU. Intra prediction using N×N partitioning may be used only for a minimum CU.

The prediction modules 230 and 235 may include a PU determination module, an inter prediction module and an intra prediction module. The PU determination module may receive a variety of information, such as PU information, prediction mode information on an intra prediction method and motion prediction-related information on an inter prediction method, etc. from the entropy decoding module 210, may determine a PU for a current CU. The PU determination module may determine which of the inter prediction and the intra prediction is performed on the PU. An inter prediction module 230 may perform inter prediction on a current PU on the basis of information on at least one picture among a previous picture and a subsequent picture of a current picture including the current PU. An inter prediction module 230 may use information necessary for inter prediction for the current PU provided from the video encoding apparatus.

In order to perform inter prediction, it may be determined on the basis of a CU whether a motion prediction method for a PU included in the CU is a skip mode, a merge mode or an AMVP mode.

An intra prediction module 235 may generate a prediction block on the basis of pixel information in a current picture. When a PU is a PU for which intra prediction is performed, intra prediction may be performed based on intra prediction mode information on the PU provided from the video encoding apparatus. The intra prediction module 235 may include an AIS filter, a reference pixel interpolation module, and a DC filter. The MS filter performs filtering on reference pixels of a current block. The AIS filter may decide whether to apply the filter or not depending on a prediction mode for the current PU. AIS filtering may be performed on the reference pixels of the current block using the prediction mode for the PU and information on the AIS filter provided from the video encoding apparatus. When the prediction mode for the current block is a mode not performing AIS filtering, the AIS filter may not be applied.

When the prediction mode for the PU is a prediction mode of performing intra prediction on the basis of pixel values obtained by interpolating the reference pixels, the reference pixel interpolation module may generate reference pixels in a unit of a fractional pixel less than an integer pixel (i.e. full pixel) by interpolating the reference pixels. When the prediction mode for the current PU is a prediction mode of generating a prediction block without interpolating the reference pixels, the reference pixels may not be interpolated.

The DC filter may generate a prediction block through filtering when the prediction mode for the current block is the DC mode.

The reconstructed block or picture may be provided to the filter module 240. The filter module 240 includes a deblocking filter, an offset module, and an ALF.

The video encoding apparatus mat provide information on whether the deblocking filter is applied to a corresponding block or picture, and information on which of a strong filter and a weak filter is applied when the deblocking filter is used. The deblocking filter of the video decoding apparatus may be provided with information on the deblocking filter from the video encoding apparatus and may perform deblocking filtering on a corresponding block.

The offset module may apply offset to the reconstructed picture on the basis of information on an offset type and offset value applied to the picture in the encoding process.

The ALF may be applied to a CU on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output module.

As described above, in the embodiments of the invention, the term "coding unit" is used as an encoding unit for a convenience of descriptions. However, the term "coding unit" may be also used as a unit of decoding.

Hereinafter, scanning methods based on prediction modes and partition modes in prediction to be illustrated in FIGS. 3 to 8 according to exemplary embodiments of the present invention may be achieved in accordance with functions of the modules of the encoding apparatus and the decoding apparatus described above in FIGS. 1 and 2, which fall within the scope of the present invention.

FIG. 3 schematically illustrates coefficient scanning methods according to the present invention.

Referring to FIG. 3, the scanning methods may include horizontal scanning 310, vertical scanning 320, and zigzag scanning 330 or upright diagonal scanning 340. Here, one of these scanning methods shown in FIG. 3 may be used based on a partitioned shape of a PU, and a 2D block of quantized transform coefficients may be changed into a 1D vector of transform coefficients by scanning.

Horizontal scanning 310, which scans transform coefficients in a horizontal direction, may be applied, for example, when a PU is a partition which is a vertically oriented block, such as an N×2N block. The vertically oriented block is highly likely to include a texture of a vertical component, in which the transform coefficients are highly likely to be distributed in the horizontal direction. Thus, a scanning order shown in the method 310 of FIG. 3 may be applied to scanning the transform coefficients.

Vertical scanning 320, which scans transform coefficients in a vertical direction, may be applied, for example, when a PU is a partition which is a horizontally oriented block, such as a 2N×N block. The horizontally oriented block is highly likely to include texture of horizontal component, in which the transform coefficients are highly likely to be distributed in the vertical direction. Thus, a scanning order shown in the method 320 of FIG. 3 may be applied to scanning the transform coefficients.

Zigzag scanning 330 or upright diagonal scanning 340 may be applied when a PU do not have particular directivity or particular component of texture. For example, zigzag scanning 330 or upright diagonal scanning 340 may be applied to 2N×2N or N×N square block.

The scanning methods of FIG. 3 are provided for examples of the present invention, and the present invention is not limited thereto. Alternative scanning methods performed in different orders may be also used as well as the scanning methods of FIG. 3.

As described above, when a PU is a partition such as an N×2N block or a 2N×N block, these blocks may be highly likely to have particular component of texture or strong directionality. Accordingly horizontal scanning or vertical scanning is used depending on a partition shape of the PU. However, even though a PU is a partition such as an N×2N block or a 2N×N block, these blocks may have insignificant directionality or not include particular component of texture. In this case, it may not be efficient to use the particular scanning methods, for example, horizontal scanning for an N×2N block and vertical scanning for a 2N×N block. Thus, a method of effectively scanning and encoding transform coefficients is needed.

Figure 4:
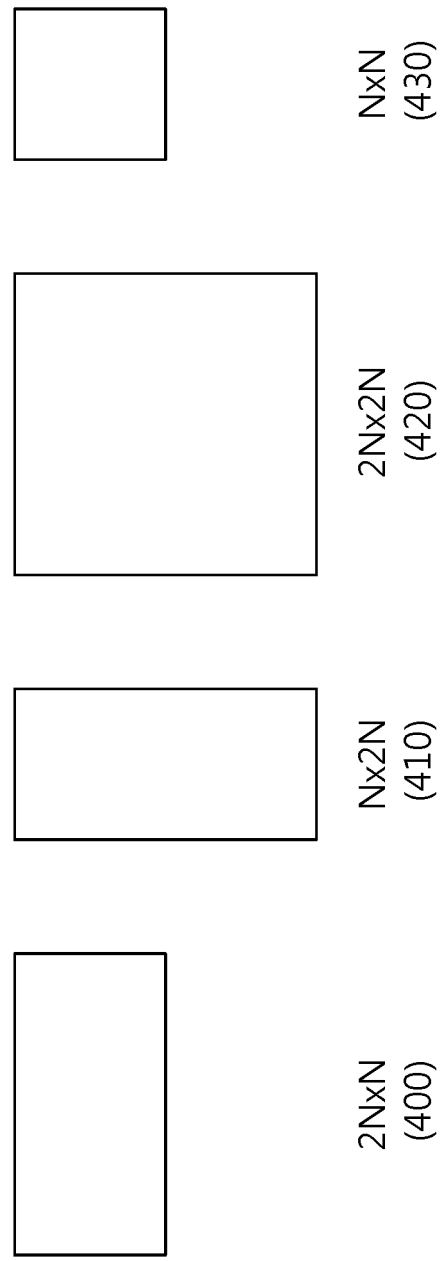
FIG. 4 illustrates a method of determining and encoding a scanning method based on a partition mode of a prediction unit according to an exemplary embodiment of the present invention.

FIG. 4 illustrates a method of determining a scanning method and encoding information thereon based on a partition mode of a PU according to an exemplary embodiment of the present invention.

Referring to FIG. 4, a single CU of an inter prediction mode may be partitioned into PUs with the same size or different sizes. For example, the CU may be partitioned into 2N×N block 400, N×2N block 410, 2N×2N block 420 or N×N block 430. Partition modes PartMode of the PUs may be determined based on sizes of the partitioned PUs.

Partition modes PartMode of PUs may include a PART_2N×N mode in which a CU is partitioned into 2N×N 400 blocks, a PART_N×2N mode in which a CU is partitioned into N×2N 410 blocks, a PART_2N×2N mode in which a CU is partitioned into 2N×2N 420 blocks, and a PART_N×N mode in which a CU is partitioned into N×N 430 blocks.

In the present embodiment, a scanning method is determined based on a partition mode of a PU, in which a partitioned shape of the partition mode may be considered. That is, candidate scanning methods may be obtained in view of partitioned shapes of PUs, among which a scanning method may be determined based on rate-distortion optimization (RDO).

When the partition mode indicates a horizontally oriented shape, for example, the partition mode is the PART_2N×N mode in which a CU is partitioned into 2N×N 400 blocks, the blocks may be likely to have particular component of texture or directionality (for example, horizontal component of texture or transform coefficients distributed in the vertical direction). Vertical scanning may be derived as a candidate scanning method in view of such a partitioned shape. Also, zigzag scanning (or upright diagonal scanning) may be derived as a candidate scanning method considering that the blocks are likely not to have particular component of texture or directionality. That is, for the partition mode of the horizontally oriented shape, a scanning method having minimum RDO may be selected among the two candidate scanning methods, vertical scanning and zigzag scanning (or upright diagonal scanning).

Alternatively, when the partition mode indicates a vertically oriented shape, for example, the partition mode is the PART_N×2N mode in which a CU is partitioned into N×2N 410 blocks, the blocks may be likely to have particular component of texture or directionality (for example, vertical component of texture or transform coefficients distributed in the horizontal direction). Horizontal scanning may be derived as a candidate scanning method in view of such a partitioned shape. Also, zigzag scanning (or upright diagonal scanning) may be derived as a candidate scanning method considering that the blocks are likely not to have particular component of texture or directionality. That is, for the partition mode of a vertically oriented shape, a scanning method having minimum RDO may be selected among the two candidate scanning methods, horizontal scanning and zigzag scanning (or upright diagonal scanning).

Meanwhile, for the partition mode of a square shape, for example, the PART_2N×2N mode in which a CU is partitioned into 2N×2N 420 blocks or the PART_N×N mode in which a CU is partitioned in N×N 430 blocks, zigzag scanning (or upright diagonal scanning) may be used.

Table 1 illustrates available scanning methods according to partition modes of PUs according to the exemplary embodiment of the present invention. Here, in the PART_2N×N mode and the PART_N×2N mode, one scanning method may be selected in view of RDO from two candidate scanning methods.

TABLE 1

| PU Partition mode | Scan pattern |
|---|---|
| PART_2N × N | Vertical scanning/Zigzag scanning |
| PART_N × 2N | Horizontal scanning/Zigzag scanning |
| PART_2N × 2N | Zigzag scanning |
| PART_N × N | Zigzag scanning |

When a scanning method is determined based on a partition mode of a PU as described above, transform coefficients may be scanned using the determined scanning method. Information on the determined scanning method may be encoded and transmitted to the decoding apparatus. The information on the scanning method may be indicated using a flag, for example, a flag isZigZagScanFlag indicating whether zigzag scanning is used.

For instance, when the partition mode of the PU is the PART_2N×N mode, information on a determined scanning method of vertical scanning and zigzag scanning (or upright diagonal scanning) may be encoded using a flag, and the flag information may be transmitted to the decoding apparatus. In the PART_2N×N mode, isZigZagScanFlag may be set to 1 if zigzag scanning is determined to be performed, and isZigZagScanFlag may be set to 0 if vertical scanning is determined to be performed. Alternatively, when the partition mode of the PU is the PART_N×2N, information on a determined scanning method of horizontal scanning and zigzag scanning (or upright diagonal) scanning may be encoded using a flag, for example, isZigZagScanFlag, and the flag information may be transmitted to the decoding apparatus.

Figure 5:
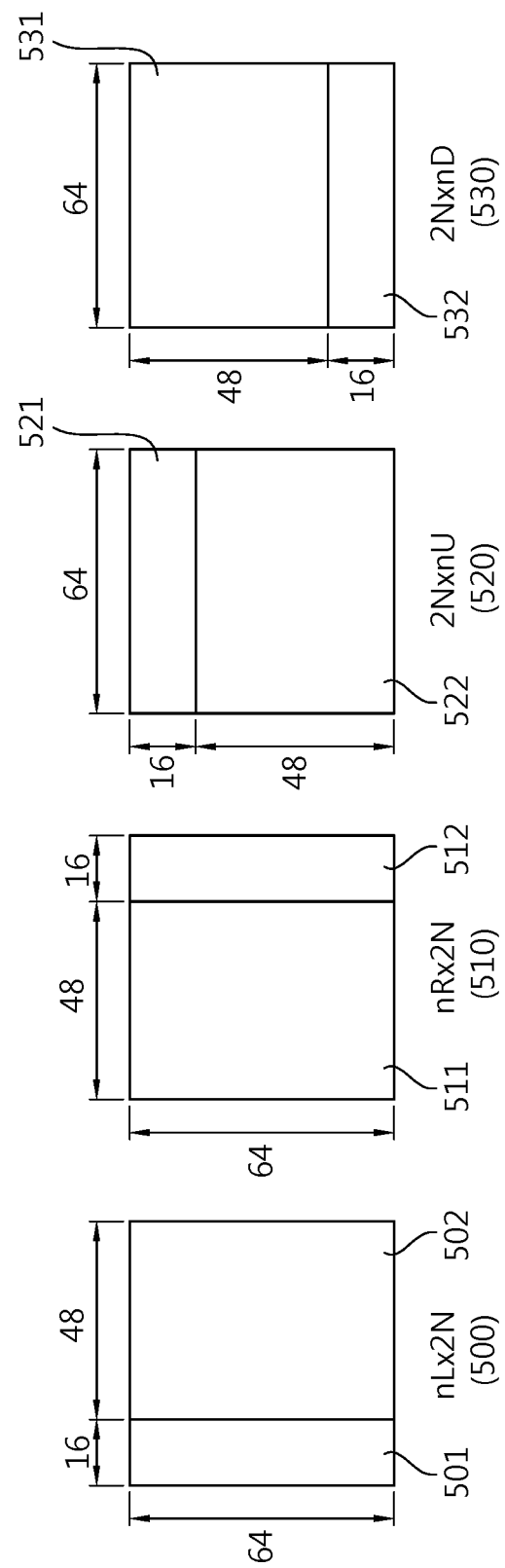
FIG. 5 illustrates a method of determining and encoding a scanning method in asymmetric motion partition (AMP) according to an exemplary embodiment of the present invention.

FIG. 5 illustrates a method of determining a scanning method and encoding the information thereon in asymmetric motion partition (AMP) according to an exemplary embodiment of the present invention.

As described above, a single CU of an inter prediction mode may be partitioned into PUs with the same size or different sizes. As shown in FIG. 5, a 64×64 block may be partitioned into 16×64 block, 48×64 block, 64×16 block or 64×48 block i.e. blocks of different shapes. This partition mode is referred to as AMP. AMP may be applied to partitioning a CU to enhance coding efficiency when a picture includes irregular image patterns.

From left of FIG. 5, AMP includes a PART_nL×2N mode in which a CU is partitioned into blocks with size of nL×2N 500, a PART_nR×2N mode in which a CU is partitioned into blocks with size of nR×2N 510, a PART_2N×nU mode in which a CU is partitioned into blocks with size of 2N×nU 520, and a PART_2N×nD mode in which a CU is partitioned into blocks with size of 2N×nD 530. Here, in the PART_nL× 2N mode and the PART_nR×2N mode, a PU may have a size of ½N×2N 501 and 512 or size of 3/2N×2N 502 and 511. In the PART_2N×nU mode and the PART_2N×nD, a PU may have a size of 2N×½N 521 and 532 or size of 2N×3/2N 522 and 531.

As described in FIG. 4, according to a embodiment of the present invention, a scanning method may be determined based on a partition mode, that is, a size of a partitioned block in AMP. That is, candidate scanning methods may be obtained in view of partitioned shapes of AMP, among which a scanning method may be determined based on RDO.

For instance, for a vertically oriented block (a block that its height is longer than its width) in the ½N×2N mode, such as a left block 501 of nL×2N block 500 and a right block 512 of nR×2N block 510, horizontal scanning considering particular component of texture or directionality that the vertically oriented block may have (for example, vertical component of texture and transform coefficients distributed in the horizontal direction), or zigzag scanning (or upright diagonal scanning) considering that the vertically oriented block does not have particular component of texture or directionality, may be derived as candidate scanning methods. Here, a scanning method having minimum RDO may be selected among the two candidate scanning methods.

Alternatively, for a horizontally oriented block (a block that its width is longer than its height) in the 2N×½N mode, such as an upper block 521 of 2N×nU block 520 and a lower block 532 of 2N×nD block 530, vertical scanning considering particular component of texture and directionality that the horizontally oriented block may have (for example, horizontal texture or transform coefficients distributed in the vertical direction), or zigzag scanning (or upright diagonal scanning) considering that the horizontally oriented block does not have particular component of texture or directionality, may be derived as candidate scanning methods. Here, a scanning method having minimum RDO may be selected among the two candidate scanning methods.

Meanwhile, zigzag scanning (or upright diagonal scanning) may be used for larger partitioned portions of nL×2N 500, nR×2N 510, 2N×nU 520 and 2N×nD 530 (i.e. 3/2N×2N and 2N×3/2N modes). That is, zigzag scanning (or upright diagonal scanning) may be used for a right partition 502 of nL×2N block 500, a left partition 512 of nR×2N block 510, a lower partition 522 of 2N×nU block 520 and an upper partition 531 of 2N×nD block 530.

When a scanning method is determined based on an AMP mode as described above, information on the determined scanning method may be encoded. For example, as described above in FIG. 4, in the PART_nL×2N mode and PART_nR×2N mode and for the vertically oriented blocks 501 and 512 (i.e. the ½N×2N mode), isZigZagScanFlag may be set to 1 if zigzag scanning is used, and isZigZagScanFlag may be set to 0 if horizontal scanning is used. In the PART_2N×nU and PART_2N×nD modes and for the horizontally oriented blocks 521 and 532 (i.e. the 2N×½N mode), isZigZagScanFlag may be set to 1 if zigzag scanning is used and isZigZagScanFlag may be set to 0 if vertical scanning is used. Such flag information may be encoded and transmitted to the decoding apparatus.

Figure 6:
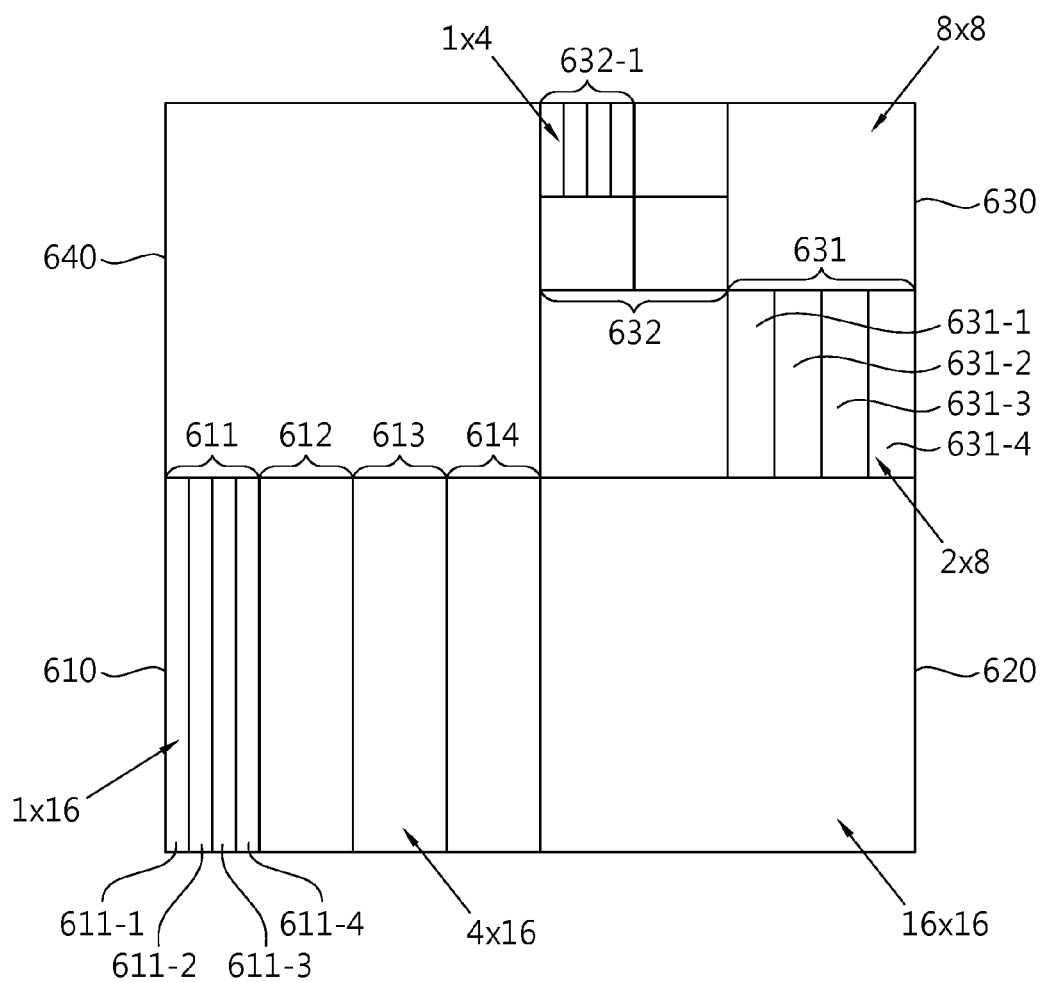
FIG. 6 illustrates a method of determining and encoding a scanning method in short distance intra prediction (SDIP) according to an exemplary embodiment of the present invention.

FIG. 6 illustrates a method of determining a scanning method and encoding the information thereon in short distance intra prediction (SDIP) according to an exemplary embodiment of the present invention.

SDIP refers to a method of partitioning a CU into 2N×2N PU, N×N PU, ½N×2N PU or 2N×½N PU and performing intra prediction on the partitioned PU. When SDIP is performed, a distance between a reference pixel for intra prediction and a prediction target pixel may be reduced as compared with in conventional intra prediction performed using a square-shaped PU. Thus a residual value that is a differential value between an original pixel and the prediction target pixel (predicted pixel) decreases, resulting in an increase in encoding efficiency.

Referring to FIG. 6, one CU may be partitioned into PUs with different sizes depending on features of a picture. For example, a 32×32 CU may be partitioned into four 16×16 PUs 610, 620, 630 and 640. A 16×16 PU 610 may be additionally partitioned into four 4×16 PUs 611, 612, 613 and 614, among which a 4×16 PU 611 may be further partitioned into four 1×16 PUs 611-1, 611-2, 611-3 and 611-4.

Likewise, a 16×16 PU 630 may be additionally partitioned into four 8×8 PUs. A 8×8 PU 631 may be further partitioned into four 2×8 PUs 631-1, 631-2, 631-3 and 631-4. Also, a 8×8 PU 632 may be further partitioned into four 4×4 PUs, among which a 4×4 PU 632-1 may be further partitioned into four 1×4 PUs.

As described above with reference to FIGS. 4 and 5, a scanning method is determined based on a partition mode of a PU in SDIP, that is, a size of the PU in the present embodiment. That is, candidate scanning methods are obtained in view of partitioned shapes of PUs, among which a scanning method is determined based on RDO.

For instance, when the partition mode of the PU in SDIP is a ½N×2N mode which has a vertically oriented partition shape such as the 4×16 PUs 611, 612, 613 and 614, the 2×8 PUs 631-1, 631-2, 631-3 and 631-4 and the 1×4 PU, horizontal scanning and zigzag scanning (or upright diagonal scanning) may be derived as candidate scanning methods in view of particular component of texture or directionality (for example, vertical texture and transform coefficients distributed in the horizontal direction). Here, a scanning method having minimum RDO may be selected among the two candidate scanning methods.

Alternatively, when the partition mode of the PU in SDIP is a 2N×½N mode which has a horizontally oriented partition shape such as 16×4 PU, 8×2 PU and 4×1 PU, vertical scanning and zigzag scanning (or upright diagonal scanning) may be derived as candidate scanning methods in view of particular component of texture or directionality (for example, horizontal texture and transform coefficients distributed in the vertical direction). Here, a scanning method having minimum RDO may be selected among the two candidate scanning methods.

Information on the determined scanning method may be encoded using a flag, for example, isZigZagScanFlag, and be transmitted to the decoding apparatus, as described above in FIGS. 4 and 5.

Figure 7:
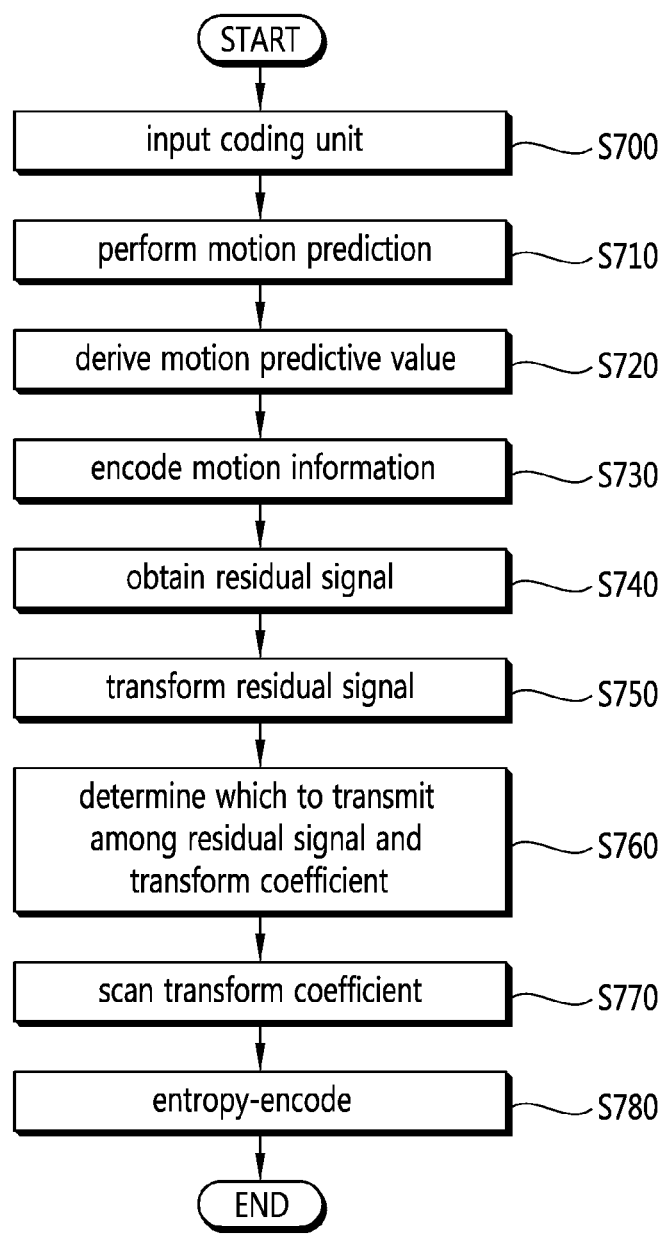
FIG. 7 is a flowchart illustrating a video encoding process according to the present invention.

FIG. 7 is a flowchart illustrating a video encoding method according to the present invention. Each step of FIG. 7 may be performed by corresponding modules of the video encoding apparatus of FIG. 1.

Referring to FIG. 7, a CU of a current picture is input to the encoding apparatus (S700). When the input CU is a CU of an inter prediction mode, the CU of the inter prediction mode ("inter CU") may include a plurality of PUs of the inter prediction mode ("inter PU") and have one of two prediction modes PreMode, a skip mode ("MODE_SKIP") and an inter mode ("MODE_INTER").

A CU in MODE_SKIP is not partitioned into smaller PUs any longer and allocated motion information on a PU with a partition mode PartMode of PART_2N×2N.

A CU in MODE_INTER may be partitioned into four types of PUs, in which information indicating that a prediction mode is MODE_INTER (PredMode==MODE_INTER) and information indicating which is a partition mode among PART_2N×2N, PART_2N×N, PART_N×2N and PART_N×N (i.e. information such as PartMode==PART_2N×2N, PartMode==PART_2N×N, PartMode==PART_N×2N, or PartMode==PART_N×N) may be transmitted to the decoding apparatus through a syntax in a CU level.

The encoding apparatus performs motion prediction for a current inter PU (S710). When the CU is partitioned into a plurality of PUs, a PU to be currently encoded ("current PU") is input. The encoding apparatus may perform motion prediction for the current PU using previous frame, subsequent frame or previous and subsequent frames of a current frame. Motion information on the current PU, such as a motion vector, a reference picture index and a prediction direction index, may be obtained through motion prediction.

The encoding apparatus may derive a motion prediction value of the current PU in the inter prediction mode (S720). The motion information on the current PU is not transmitted to the decoding apparatus as it is but differential values from predicated values obtained from temporally and spatially neighboring blocks are transmitted to the decoding apparatus so as to enhance compression efficiency. Motion prediction method may include a merge mode and an AMVP mode, which may be used to derive a motion prediction value.

In the merge mode, merging candidates are obtained from motion information on blocks temporally and spatially neighboring to the current PU. When a candidate having the same motion information as the current PU is present among the candidates, the encoding apparatus may transmit a flag Merge_Flag indicating that the merge mode is used and an index of the candidate having the same motion information as the current PU to the decoding apparatus. In detail, the encoding apparatus derives an available temporal motion vector predictor (MVP) value using a reference picture index refIdxLX indicating a reference picture obtained in motion prediction and makes a merging candidate list MergeCandList. When a candidate having the same motion information as the current PU is present on the merging candidate list, the encoding apparatus sets Merge_Flag to 1 and encodes an index Merge_Idx of the candidate.

In the AMVP mode, the encoding apparatus derives AMVP candidates from motion information on blocks temporally and spatially neighboring to the current PU. That is, the encoding apparatus derives a motion vector predictor value mvpLX of a luma component. In detail, the encoding apparatus derives spatial motion vector candidates (MVPs) from neighboring PUs to the current PU. The encoding apparatus derives a temporal motion vector candidate of a collocated block using a reference picture index RefIdxLX obtained in motion prediction. The encoding apparatus makes an MVP list mvpListLX based on the spatial motion vector candidates and the temporal motion vector candidate. When a plurality of motion vectors has the same value on the MVP list, the encoding apparatus removes motion vectors other than a motion vector having a highest priority from the MVP list. Here, motion vectors may have priories in order of motion vectors (mvLXA) of left neighboring blocks to the current PU, motion vectors (mvLXB) of upper neighboring blocks to the current PU and a motion vector (mvLXCol) of a temporal collocated block, which are available. A motion vector of a best predictor among the motion vector candidates on the MVP list is selected as a motion vector predictive value mvpLX. The best predictor is a candidate block minimizing a rate-distortion (RD) cost function, for example, $J_{MotSAD}$ considering bit cost and sum of absolute difference (SAD).

The encoding apparatus encodes the motion information on the current PU (S730). When the merge mode is used for motion prediction of the current PU, if a candidate having the same motion information as the current PU is present among merging candidates, the encoding apparatus indicates that the merge mode is applied to the current PU, and encodes and transmits a flag Merge_Flag indicating that the merge mode is used and an index Merge_Idx of the candidate having the same motion information as the current PU to the decoding apparatus.

When the AMVP mode is used for motion prediction of the current PU, the encoding apparatus determines a candidate minimizing a cost function among AMVP candidates by comparing motion vector information on the AMVP candidates with motion vector information on the current PU. The encoding apparatus performs motion compensation using the candidate minimizing the cost function and a differential value between the motion information on candidate minimizing the cost function and the motion information on current PU, thereby obtaining a residual signal. That is, the encoding apparatus may entropy-encode a motion vector difference between a motion vector of the current PU and the motion vector of the best predictor.

The encoding apparatus obtains the residual signal by deriving a difference by pixels between a pixel value of the current block and a pixel value of the prediction block through motion compensation (S740) and transforms the residual signal (S750).

The residual signal is encoded via transformation, in which a transcoding kernel may be used for transformation. A transcoding kernel may have a shape of 2×2, 4×4, 8×8, 16×16, 32×32 or 64×64, among which a kernel to be used for transformation may be determined in advance. Here, transform coefficients are generated by transformation and form a 2D block. For example, transform coefficients C for an n×n block may be derived by Equation 1.

$$C(n,n)=T(n,n)\times B(n,n)\times T(n,n)^T \qquad \text{[Equation 1]}$$

Here, C(n, n) is an n×n matrix of transform coefficients, T(n, n) is an n×n transformation kernel matrix, and B(n, n) is an n×n matrix of a residual block.

The transform coefficients calculated by Equation 1 are quantized.

The encoding apparatus determines based on RDO which to transmit among the residual signal and the transform coefficients (S760). When prediction is properly done, the residual signal may be transmitted as it is, without transcoding. Here, the encoding apparatus may compare cost functions before/after transcoding and may select a method having minimum costs.

The encoding apparatus may transmit a type of a signal to transmit (e.g. the residual signal or the transform coefficients), with respect to the current block and transmit the signal to the decoding apparatus. For example, if transmitting the residual signal as it is without transcoding involves minimum cost, the encoding apparatus may signal the residual signal with respect to the current block. If transmitting the transform coefficients involves minimum cost, the encoding apparatus may signal the transform coefficients with respect to the current block.

The encoding apparatus scans the transform coefficients (S770). The encoding apparatus changes quantized transform coefficients of a 2D block form into transform coefficients of a 1D vector form by scanning. Here, one of horizontal scanning, vertical scanning and zigzag scanning (or upright diagonal scanning) may be selected based on a size of a PU, that is, a partition mode of the PU, to scan the transform coefficients.

In detail, candidate scanning modes (methods) may be derived based on partition shapes of PUs, among which a scanning mode is determined based on RDO. If the partition mode of the PU has a vertically oriented partition shape, horizontal scanning and zigzag scanning (or upright diagonal scanning) are derived as candidate scanning modes. If the partition mode of the PU has a horizontally oriented partition shape, vertical scanning and zigzag scanning (or upright diagonal scanning) are derived as candidate scanning modes. Then, a scanning mode having minimum RDO is selected among the candidate scanning modes.

Here, as described above in FIGS. 4 and 6, such scanning modes may be applied to the partition modes of the PU in inter prediction, for example, the N×2N block, 2N×N block, 2N×2N block, N×N block, 2N×nU block, 2N×nD block, nL×2N block and nR×2N block modes, and the partition modes of the PU in an intra prediction mode (e.g. short distance intra prediction: SDIP), for example, the ½N×2N block, 2N×½N block, N×N block and 2N×2N block modes. As for this, descriptions thereof are omitted herein since already fully described before.

The encoding apparatus may entropy-encode the information to be transmitted (S780). That is, the encoding apparatus may entropy-encode the scanned transform coefficients and information on the prediction mode. The encoded information may form a compressed bitstream and be stored or transmitted in a network abstraction layer (NAL).

Figure 8:
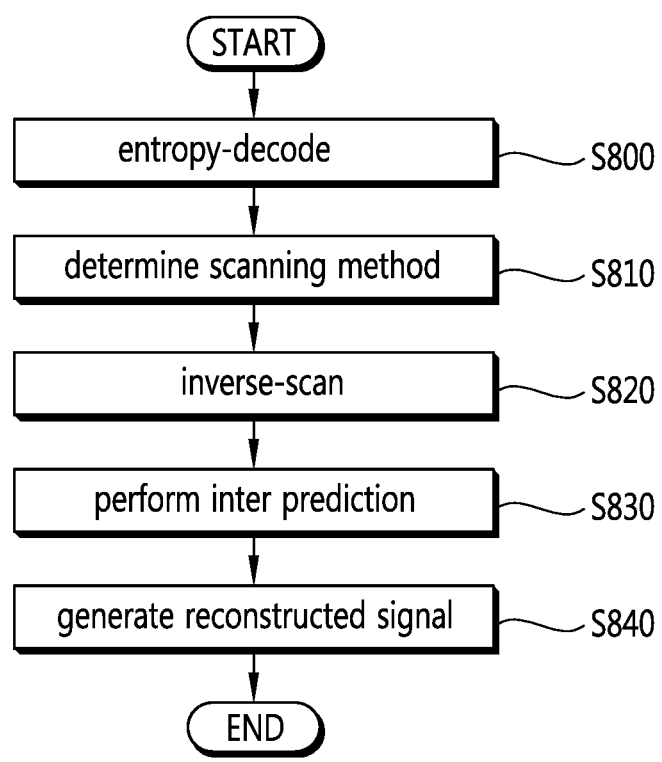
FIG. 8 is a flowchart illustrating a video decoding process according to the present invention.

FIG. 8 is a flowchart illustrating a video decoding method according to the present invention. Each step of FIG. 8 may be performed by corresponding modules of the video decoding apparatus of FIG. 2.

Referring to FIG. 8, the decoding apparatus may entropy-decode a received bitstream (S800). The decoding apparatus may identify a block type from a variable length coding (VLC) table to recognize a prediction mode of a current block. Further, the decoding apparatus may identify information on whether transmitted information on the current block is a residual signal or transform coefficients. Depending on a result, the decoding apparatus may obtain the residual signal or transform coefficients for the current block.

The decoding apparatus may determine a scanning method (S810). That is, the decoding apparatus determines a scanning method based on a partition mode of a PU using information signaled from the encoding apparatus. The signaled information may be a flag indicating whether zigzag scanning is used (for example, isZigZagScanFlag).

Specifically, when the partition mode of the PU has a vertically oriented partitioned shape or horizontally oriented partitioned shape, the decoding apparatus decodes a flag indicating whether zigzag scanning is used and determines a scanning method based on a value of the decoded flag. When the partition mode of the PU has the vertically oriented partition shape, the decoding apparatus selects one of zigzag scanning and horizontal scanning based on the value of the decoded flag. When the partition mode of the PU has the horizontally oriented partition shape, the decoding apparatus selects one of zigzag scanning and vertical scanning based on the value of the decoded flag. For instance, zigzag scanning is used when isZigZagScanFlag is 1, while horizontal scanning (for the partition mode having the vertically oriented partition shape)/vertical scanning (for the partition mode having the horizontally oriented partition shape) may be used when isZigZagScanFlag is 0.

Here, as described above in FIGS. 4 and 6, such scanning methods may be applied to the partition modes of the PU in inter prediction, for example, the N×2N block, 2N×N block, 2N×2N block, N×N block, 2N×nU block, 2N×nD block, nL×2N block and nR×2N block modes, and the partition modes of the PU in intra prediction (e.g. short distance intra prediction: SDIP), for example, the ½N×2N block, 2N×½N block, N×N block and 2N×2N block modes. As for this, descriptions thereof are omitted herein since already fully described before.

Meanwhile, zigzag scanning may be used for a partition mode having a square shape, such as 2N×2N block and N×N block modes, or for a right partition of nL×2N block mode, a left partition of nR×2N block mode, a lower partition of 2N×nU block mode or an upper partition of 2N×nD block mode as larger partitioned portions in AMP.

The decoding apparatus may inverse-scan the entropy decoded residual signal or transform coefficients (S820). The decoding apparatus may generate a residual block by inverse-scanning for the case of the residual signal and may generate a 2D transform block by inverse-scanning for the case of the transform coefficients. When the transform block is generated, the decoding apparatus may dequantize and inverse-transform the transform block, thereby obtaining a residual block. A process of obtaining a residual block by inverse-transforming a transform block is expressed by Equation 2.

$$B(n,n)=T(n,n)\times C(n,n)\times T(n,n)^T \quad \text{[Equation 2]}$$

Here, B(n, n) is an n×n matrix of a residual block, T(n, n) is an n×n transformation kernel matrix, and C(n, n) is an n×n matrix of transform coefficients.

The decoding apparatus may perform inter prediction (S830). The decoding apparatus may decode information on the prediction mode and perform inter prediction according to the prediction mode.

For example, when the prediction mode PredMode is the merge mode (for example, PredMode==MODE_SKIP && Merge_Flag==1), the decoding apparatus may derive a motion vector mvLX of a luma component and a reference picture index refIdxLX for the merge mode. To this end, the decoding apparatus may derive merging candidates from partitions of PUs (i.e. prediction blocks) spatially neighboring to the current PU. The decoding apparatus may derive the reference picture index refIdxLX so as to obtain a temporal merging candidate for the current PU. The decoding apparatus may derive an available temporal motion vector predictor value (MVP) using the derived reference picture index. When a number NumMergeCand of candidates on a merging candidate list MergeCandList made based on the spatial merging candidates and the temporal merging candidate is 1, the decoding apparatus sets a merging candidate index (Merge_Idx) to 1. Otherwise, the decoding apparatus may set the merging candidate index to a received merge index. The decoding apparatus derives a motion vector (mvLX) of a merging candidate indicated by the received merge index and the reference picture index (refIdxLX). The decoding apparatus may use the derived motion vector and the derived reference picture index for motion compensation.

When the prediction mode PredMode is the AMVP mode, the decoding apparatus may derive a reference picture index (refIdxLX) for the current PU and may derive a motion vector predictor value (mvpLX) of a luma component using the reference picture index. In detail, the decoding apparatus may derive spatial motion vector candidates (MVPs) from neighboring PUs to the current PU and may derive a temporal motion vector candidate (MVP) of a collocated block indicated by the reference picture index. The decoding apparatus may generate an MVP list mvpListLX based on the derived spatial motion vector candidates and the derived temporal motion vector candidate. When a plurality of motion vectors has the same value on the MVP list, the decoding apparatus may remove motion vectors other than a motion vector having a highest priority from the MVP list. Here, as described above, motion vectors have priories in order of motion vector (mvLXA) of left neighboring block to the current PU, motion vector (mvLXB) of upper neighboring block to the current PU and a motion vector (mvLXCol) of a temporal collocated block, which are available. When a number NumMVPCand(LX) of MVP candidates on the MVP list is 1, the decoding apparatus may set an MPV candidate index mvpIdx to 0. When the number of MVP candidates is 2 or more, the decoding apparatus may set the MPV candidate index mvpIdx equal to a received index value. The decoding apparatus may determine a motion vector indicated by mvpIdx among the MVP candidates on the MVP list mvpListLX as a motion vector predictor value mvpLX. The decoding apparatus may derive a motion vector mvLX using a motion vector predictor value mvpLX and Equation 3.

$$mvLX[0]=mvdLX[0]+mvpLX[0]$$

$$mvLX[1]=mvdLX[1]+mvpLX[1] \quad \text{[Equation 3]}$$

Here, mvLX[0], mvdLX[0] and mvpLX[0] are x components of an LX motion vector information (i.e. x components of mvLX, mvdLX and mvpLX), and mvLX[1], mvdLX[1] and mvpLX[1] are y components of the LX motion vector information (i.e. y components of mvLX, mvdLX and mvpLX).

The decoding apparatus may derive a reconstructed signal (S840). For instance, the decoding apparatus may add the residual signal to a signal of a previous frame (i.e. predicted signal) to generate the reconstructed signal. The decoding apparatus may add a prediction signal of the previous frame obtained by motion compensation using a derived motion vector and the decoded residual signal for the current PU, thereby generating the reconstructed signal.

Although the methods have been described with a series of stages or blocks based on the flowcharts in the aforementioned embodiments, the present invention is not limited to the foregoing sequence of the stages. Some stages may be carried out in different order from described above or at the same time. Also, it will be understood by those skilled in the art that the stages illustrated in the flowcharts are not exclusive, additional stages may be included in the flowchart, or one or more stages may be deleted from the flowcharts without affecting the scope of the present invention.

While a few exemplary embodiments have been shown and described with reference to the accompanying drawings, it will be apparent to those skilled in the art that various modifications and variations can be made from the foregoing descriptions without departing from the essence of the present invention. The exemplary embodiments are provided not to restrict the concept of the present invention but to illustrate the present invention and do not limit the scope of the present invention. The scope of the invention is defined by the appended claims, and all differences within the scope will be construed as being included within the appended claims of the present invention.

The invention claimed is:

1. A method of decoding a video signal having a current block to be decoded with a decoding apparatus, comprising:
    obtaining index information relating to the current block from the video signal, the index information being signaled to select a collocated picture from a plurality of previously decoded pictures,
    the collocated picture being representative of a picture including a collocated block which is used to derive a temporal motion vector candidate of the current block;
    obtaining a spatial motion vector candidate from a spatial neighboring block of the current block;
    selecting, based on the index information, the collocated picture relating to the temporal motion vector candidate of the current block from the plurality of the previously decoded pictures;
    obtaining the temporal motion vector candidate from the collocated block included in the selected collocated picture;
    generating a motion vector candidate list using the spatial motion vector candidate and the temporal motion vector candidate;
    deriving a motion vector predictor based on the motion vector candidate list and a candidate index of the current block,
        the candidate index specifying one of motion vector candidates included in the motion vector candidate list;
    obtaining prediction samples of the current block by using the motion vector predictor;
    obtaining residual samples relating to the current block by performing an inverse quantization and an inverse-transform on coefficients from the video signal; and
    reconstructing the current block by using the prediction samples and the residual samples,
    wherein the collocated picture has a temporal order different from a current picture including the current block,
    and the collocated block corresponds to a position as the current block.

2. The method of claim 1, wherein the spatial neighboring block includes at least one of a left neighboring block or a top neighboring block.

3. The method of claim 1, wherein the spatial motion vector candidate is arranged, in the motion vector candidate list, prior to the temporal motion vector candidate.

* * * * *